(12) United States Patent
Shindo et al.

(10) Patent No.: US 10,873,077 B2
(45) Date of Patent: Dec. 22, 2020

(54) METHOD FOR MANUFACTURING LITHIUM ION BATTERY

(71) Applicant: TOYOTA JIDOSHA KABUSHIKI KAISHA, Toyota (JP)

(72) Inventors: Yohei Shindo, Susono (JP); Yoshitomo Takebayashi, Toyota (JP); Sho Ando, Toyota (JP); Yusuke Shimo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 16/369,186

(22) Filed: Mar. 29, 2019

(65) Prior Publication Data
US 2019/0229331 A1 Jul. 25, 2019

Related U.S. Application Data

(62) Division of application No. 15/435,543, filed on Feb. 17, 2017, now abandoned.

(30) Foreign Application Priority Data

Mar. 23, 2016 (JP) ................. 2016-058934

(51) Int. Cl.
| | |
|---|---|
| H01M 4/36 | (2006.01) |
| H01B 1/08 | (2006.01) |
| H01M 4/131 | (2010.01) |
| H01M 4/62 | (2006.01) |
| H01M 4/485 | (2010.01) |
| H01M 4/505 | (2010.01) |
| H01M 4/525 | (2010.01) |
| H01M 4/66 | (2006.01) |

(Continued)

(52) U.S. Cl.
CPC ............. *H01M 4/366* (2013.01); *H01B 1/08* (2013.01); *H01M 4/131* (2013.01); *H01M 4/485* (2013.01); *H01M 4/505* (2013.01); *H01M 4/525* (2013.01); *H01M 4/625* (2013.01); *H01M 4/628* (2013.01); *H01M 4/663* (2013.01); *H01M 10/0525* (2013.01); *H01M 2004/028* (2013.01)

(58) Field of Classification Search
CPC .................................................. H01M 4/366
USPC ........................................................ 429/223
See application file for complete search history.

(56) References Cited

U.S. PATENT DOCUMENTS

| | | |
|---|---|---|
| 8,399,132 B2 | 3/2013 | Park |
| 2009/0214958 A1 | 8/2009 | Park |

(Continued)

FOREIGN PATENT DOCUMENTS

| | | |
|---|---|---|
| JP | 2003-173770 A | 6/2003 |
| JP | 2004-319268 A | 11/2004 |

(Continued)

*Primary Examiner* — James M Erwin
(74) *Attorney, Agent, or Firm* — Dickinson Wright PLLC

(57) ABSTRACT

A lithium ion secondary battery is disclosed that can inhibit generation of gas due to decomposition of a non-aqueous electrolyte solution. The lithium ion battery includes a cathode, a non-aqueous electrolyte solution and an anode, wherein the cathode includes a conductive material, a layered niobium-containing oxide that coats a surface of the conductive material, and a lithium-containing oxide active material having an upper-limit potential to a redox potential of metal lithium of no less than 4.5 V (vs. Li/Li$^+$).

10 Claims, 4 Drawing Sheets

(51) Int. Cl.
*H01M 10/0525* (2010.01)
*H01M 4/02* (2006.01)

(56) References Cited

U.S. PATENT DOCUMENTS

| | | | |
|---|---|---|---|
| 2011/0099798 A1† | 5/2011 | Nilsen |
| 2012/0196193 A1 | 8/2012 | Sotowa et al. |
| 2014/0255798 A1† | 9/2014 | Amine |
| 2015/0221933 A1 | 8/2015 | Mizawa et al. |
| 2016/0079602 A1 | 3/2016 | Shindo |
| 2016/0079641 A1 | 3/2016 | Kim et al. |
| 2016/0226057 A1† | 8/2016 | Kelder |
| 2016/0351973 A1† | 12/2016 | Albano |

FOREIGN PATENT DOCUMENTS

| | | |
|---|---|---|
| JP | 2011-070789 A | 4/2011 |
| JP | 2012-124026 A | 6/2012 |
| JP | 2015-144108 A | 8/2015 |
| JP | 2015-204256 A | 11/2015 |

† cited by third party

METHOD FOR MANUFACTURING LITHIUM ION BATTERY

CROSS REFERENCE TO RELATED APPLICATIONS

This application is a division of U.S. patent application Ser. No. 15/435,543, filed Feb. 17, 2017, which claims priority to Japanese Application No. 2016-058934 filed Mar. 23, 2016, which is hereby incorporated by reference in its entirety.

TECHNICAL FIELD

The present disclosure relates to lithium ion batteries and methods for manufacturing the same.

BACKGROUND

Patent Literature 1 discloses a non-aqueous electrolyte solution lithium ion battery including $LiNi_{0.5}Mn_{1.5}O_4$ as a cathode active material. $LiNi_{0.5}Mn_{1.5}O_4$ has an upper-limit potential to the redox potential of metal lithium of no less than 4.5 V (vs. Li/Li$^+$), which is a high potential. By using such a high potential cathode active material, it is possible to easily increase the operating voltage of a lithium ion battery. However, if a high potential cathode active material is used, a problem arises that gases are generated in the battery due to decomposition of the non-aqueous electrolyte solution.

In order to solve this problem, various improvements are proposed to the cathodes of lithium ion batteries. For example, Patent Literatures 2 to 4 suggest coating the surface of a cathode active material with a niobium-containing oxide and the like. Patent Literature 5 suggests mixing a niobium-containing oxide in a cathode mixture that forms a cathode. According to the techniques disclosed in Patent Literatures 2 to 5, it is considered that the area where the cathode active material and the non-aqueous electrolyte solution directly contact with each other can be reduced by the niobium-containing oxide and the like, whereby the reaction of the cathode active material and the non-aqueous electrolyte solution can be inhibited and the decomposition of the non-aqueous electrolyte solution can be inhibited. It is also considered that the niobium-containing oxide functions as a negative catalyst in the cathode mixture, whereby the activity of the cathode active material lowers and the decomposition of the non-aqueous electrolyte solution can be inhibited.

CITATION LIST

Patent Literatures

Patent Literature 1: JP 2012-124026 A
Patent Literature 2: JP 2015-144108 A
Patent Literature 3: JP 2015-204256 A
Patent Literature 4: JP 2011-070789 A
Patent Literature 5: JP 2004-319268 A

SUMMARY OF THE DISCLOSURE

Technical Problem

Patent Literatures 2 to 5 each discloses a technique of inhibiting the reaction of a cathode active material and a non-aqueous electrolyte solution. However, the inventors of the present disclosure have newly found that the decomposition of a non-aqueous electrolyte solution in a high-voltage lithium battery is not only due to the reaction with a cathode active material. That is, in order to further inhibit the generation of gas due to decomposition of the non-aqueous electrolyte solution, they considered that a method other than the methods of "coating the surface of the cathode active material" and "mixing a negative catalyst in the cathode mixture" as disclosed in Patent Literatures 2 to 5 is needed.

Considering the above, disclosed is a lithium ion secondary battery that can inhibit generation of gas due to decomposition of a non-aqueous electrolyte solution, and a method for manufacturing the lithium ion secondary battery.

Solution to the Problem

The inventors presumed that, in a lithium ion battery including a high potential cathode active material, gases are generated due to decomposition of a non-aqueous electrolyte solution, with the following mechanisms.
(1) In a cathode mixture, there is a conductive material that contacts the cathode active material.
(2) When the cathode active material has a high potential, the conductive material that contacts the cathode active material also has a high potential.
(3) When the conductive material having a high potential and the non-aqueous electrolyte solution contact each other, the non-aqueous electrolyte solution decomposes on the surface of the conductive material, whereby gases are generated.

The above presumed mechanisms had not been considered at all before. As a result of various research based on the presumed mechanisms, the inventors of the present disclosure found that the generation of gas can be remarkably inhibited by coating the surface of the conductive material with a niobium-containing oxide.

Based on the above findings, the present disclosure is directed to the following embodiments. That is, an embodiment of the present disclosure is a lithium ion battery including: a cathode; a non-aqueous electrolyte solution; and an anode, wherein the cathode includes a conductive material, a layered niobium-containing oxide that coats a surface of the conductive material, and a lithium-containing oxide active material having an upper-limit potential to a redox potential of metal lithium of no less than 4.5 V (vs. Li/Li$^+$).

"Layered niobium-containing oxide that coats a surface of the conductive material" means that the surface of the conductive material is continuously coated with the niobium-containing oxide along the surface shape of the conductive material. That is, it means that the surface of the conductive material is coated with a film of the niobium-containing oxide, or that the niobium-containing oxide is accumulated in a layer on the surface of the conductive material. It is noted that the niobium-containing oxide does not have to cover the whole surface of the conductive material, and it may be a layer(s) including a discontinuous part. In this point, the lithium ion battery of the present disclosure is clearly different from the conventional batteries (batteries in which surfaces of active materials are coated, or batteries in which conductive materials and niobium-containing oxides are simply mixed).

"Niobium-containing oxide" means that niobium is contained as an element constituting the oxide. The niobium-containing oxide may include, in addition to niobium and oxygen, elements other than niobium and oxygen.

"Lithium-containing oxide active material having an upper-limit potential to a redox potential of metal lithium of no less than 4.5 V (vs. Li/Li$^+$)" means that part of the potential of the lithium-containing oxide active material at which lithium is occluded/released is no less than 4.5 V to the redox potential of metal lithium. That is, the lithium-containing oxide active material is a cathode active material of a lithium ion battery, and has a flat part at a potential of no less than 4.5 V (vs. Li/Li$^+$).

"Lithium-containing oxide" means that lithium is contained as an element constituting the oxide. "Lithium-containing oxide" is not particularly limited in the constituent elements other than lithium and oxygen and composition ratio of the elements, as long as the lithium-containing oxide is an active material that has an upper-limit potential to the redox potential of metal lithium of no less than 4.5 V (vs. Li/Li$^+$).

In the lithium ion battery of the present disclosure, the thickness of the layered niobium-containing oxide may be no less than 0.4 nm.

In the lithium ion battery of the present disclosure, the thickness of the layered niobium-containing oxide may be in the range of from 0.4 nm to 5 nm.

In the lithium ion battery of the present disclosure, the conductive material may be formed from a carbon material.

An embodiment of the present disclosure is a method for manufacturing a lithium ion battery including: coating a surface of a conductive material with a layered niobium-containing oxide to form a complex; mixing the complex and a lithium-containing oxide active material having an upper-limit potential to a redox potential of metal lithium of no less than 4.5 V (vs. Li/Li$^+$) to obtain a cathode mixture; manufacturing a cathode from the cathode mixture; and manufacturing a power generation element from the cathode, a non-aqueous electrolyte solution and an anode.

In the manufacturing method of the present disclosure, in the coating, the surface of the conductive material may be coated with the layered niobium-containing oxide by an atomic layer deposition (ALD).

According to the lithium ion battery of the present disclosure, it is possible to inhibit generation of gas due to decomposition of the non-aqueous electrolyte solution.

BRIEF DESCRIPTION OF DRAWINGS

In the drawings, the reference numbers are used throughout to refer to the same elements. The various features, advantages and technical aspects of the embodiments of the disclosure will be described below.

DESCRIPTION OF EMBODIMENTS

1. Lithium Ion Battery 100

Figure 1:
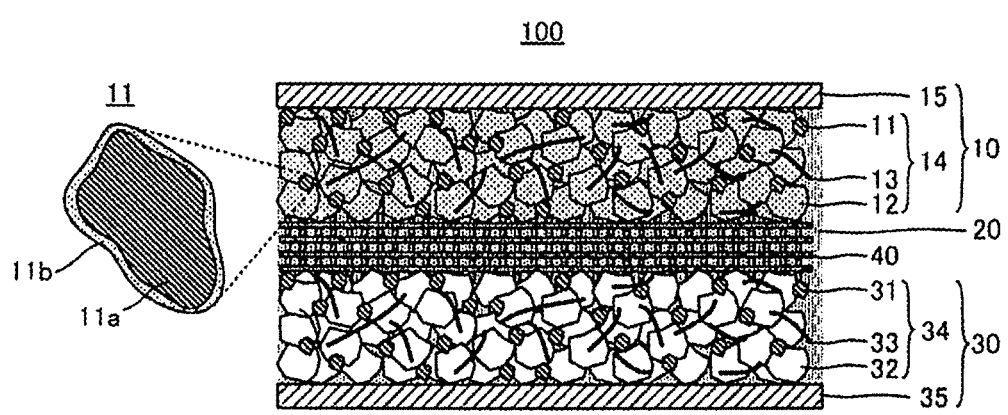
FIG. 1 is a schematic view to explain the structure of a lithium ion battery 100.

A lithium ion battery 100 in FIG. 1 includes a cathode 10, a non-aqueous electrolyte solution 20 and an anode 30. The cathode 10 includes a conductive material 11a, a layered niobium-containing oxide 11b coating on the surface of the conductive material 11a, and a lithium-containing oxide active material 12 having an upper potential to the redox potential of metal lithium of no less than 4.5 V (vs. Li/Li$^+$).

1.1. Cathode 10

1.1.1. Conductive Material 11a

The cathode 10 includes the conductive material 11a. Examples of the conductive material 11a include conductive materials formed from a carbon material such as vapor-grown carbon fiber, acetylene black (AB), Ketjen black (KB), carbon nanotube (CNT) and carbon nanofiber (CNF), and conductive materials formed from a metal material that can endure the use environment of non-aqueous electrolyte solution lithium ion batteries. Specifically, a conductive material formed from a carbon material may be used. For the conductive material 11a, one kind may be used alone, or a mixture of two or more kinds may also be used.

The conductive material 11a may be particulate or fibrous. If the conductive material 11a is formed as particles, the primary particle diameter may be in the range of from 5 nm to 100 nm, and the aspect ratio may be less than 2. The lower limit of the primary particle diameter of the particulate conductive material 11a may be no less than 10 nm, and may be no less than 15 nm. The upper limit may be no more than 80 nm, and may be no more than 65 nm. By using such a particulate conductive material 11a, it is possible to further improve the conductivity of the cathode 10. If the conductive material 11a is formed as fibers, the fiber diameter thereof may be in the range of from 10 nm to 1 μm, and the aspect ratio may be no less than 20. The lower limit of the fiber diameter of the fibrous conductive material 11a may be no less than 30 nm, and may be no less than 50 nm. The upper limit may be no more than 700 nm, and may be no more than 500 nm. The lower limit of the aspect ratio of the fibrous conductive material may be no less than 30, and may be no less than 50.

The content of the conductive material 11a in the cathode 10 is not particularly limited. For example, setting the total amount of the conductive material 11a, and the lithium-containing oxide active material 12 and the binder 13, which are described later, as 100 mass %, the content of the conductive material 11a may be no less than 2 mass %, may be no less than 5 mass %, and may be no less than 7 mass %. The upper limit is not particularly limited, and may be no more than 15 mass %, may be no more than 13 mass %, and may be no more than 10 mass %. With the content of the conductive material 11a in these ranges, it is possible to obtain the cathode 10 with excellent ion conductivity and electron conductivity.

1.1.2. Layered Niobium-Containing Oxide 11b

The cathode 10 includes the layered niobium-containing oxide 11b that coats the surface of the conductive material 11a. For example, as shown in FIG. 1, the cathode 10 includes the niobium-containing oxide 11b continuously coating the surface of the conductive material 11a in a manner to be along the surface shape of the conductive material 11a. In other words, a film of the niobium-containing oxide 11b coats the surface of the conductive material 11a. Alternatively, the niobium-containing oxide 11b in layer is accumulated on the surface of the conductive material 11a. In this way, the cathode 10 includes a complex 11 of the conductive material 11a and the niobium-containing oxide 11b.

The complex 11 shown in FIG. 1 may be considered as a core-shell structure in which the conductive material 11a is a core and the niobium-containing oxide 11b is a shell. However, in the complex 11, the niobium-containing oxide 11b does not have to cover the whole surface of the conductive material 11a, and may be a layer(s) including a discontinuous part. In other words, in the complex 11, part of the surface of the conductive material 11a may be exposed. In this case, no less than 50% of the surface of the conductive material 11a may be coated with the niobium-containing oxide 11b. The coated part may be no less than 70%, and may be no less than 90%.

"Niobium-containing oxide" is an oxide including niobium as a constituent element. "Niobium-containing oxide" may include an element other than niobium and oxygen, in addition to niobium and oxygen. For example, as the element other than niobium and oxygen, one or more elements selected from the group consisting of lithium, carbon and nitrogen may be included.

Specific examples of "niobium-containing oxide" include niobium oxide and lithium niobate. These oxides can further inhibit generation of gas due to decomposition of the non-aqueous electrolyte solution.

The layered niobium-containing oxide 11b may have a thickness of no less than 0.4 nm. This is because generation of gas due to decomposition of the non-aqueous solution may be further inhibited with this thickness. The upper limit of the thickness is not particularly limited, and with any thickness, generation of gas due to decomposition of the non-aqueous electrolyte solution may be inhibited. However, according to the findings of the inventors of the present disclosure, in addition to the effect of inhibiting generation of gas due to decomposition of the non-aqueous electrolyte solution, a new effect of making the resistance of the cathode 10 small is obtained, by making the thickness of the layered niobium-containing oxide 11b no more than 5 nm. That is, the layered niobium-containing oxide 11b especially may have a thickness in the range of from 0.4 nm to 5 nm.

Whether the surface of the conductive material 11a is coated with the layered niobium-containing oxide 11b or not can be easily confirmed for example by obtaining a HAADF-STEM image by a high-angle annular dark-field method by means of a scanning transmission electron microscope (HAADF-STEM method).

1.1.3. Lithium-Containing Oxide Active Material 12

The cathode 10 includes the lithium-containing oxide active material 12 having an upper potential to the redox potential of metal lithium of no less than 4.5 V (vs. Li/Li$^+$). Part of the potential of the lithium-containing oxide active material 12 at which lithium is occluded/released is no less than 4.5 V to the redox potential of metal lithium. That is, the lithium-containing oxide active material 12 is a cathode active material of the lithium ion battery 100, and has a flat part at a potential of no less than 4.5 V (vs. Li/Li$^+$). For the lithium-containing oxide active material 12, one kind may be used alone, or a mixture of two or more kinds may also be used.

"Lithium-containing oxide" means that lithium is contained as an element that constitutes the oxide. The kind of the "lithium-containing oxide" is not particularly limited as long as the oxide is an active material having an upper potential to the redox potential of metal lithium of no less than 4.5 V (vs. Li/Li$^+$). For example, by including one or more elements selected from nickel, manganese and cobalt in the lithium-containing oxide as an element other than lithium and oxygen, it is possible to form the active material 12 of such a high potential.

Specific examples of "lithium-containing oxide" include lithium nickel manganese composite oxides of a spinel structure, lithium nickel cobalt manganese oxide of a layered structure, and cobalt olivine of an olivine structure. Specifically, lithium nickel manganese composite oxides of a spinel structure may be used, because a cathode active material of much higher potential may be made.

The shape of the lithium-containing oxide active material 12 is not particularly limited. For example, it may be formed as particles or a thin film. If the lithium-containing oxide active material 12 is formed as particles, the primary particle diameter may be in the range of from 1 nm to 100 µm. The lower limit may be no less than 10 nm, may be no less than 100 nm, and may be no less than 500 nm. The upper limit may be no more than 30 µm, and may be no more than 10 µm. The lithium-containing oxide active material 12 may form a secondary particle in which the primary particles are gathered or agglomerated. In this case, the particle diameter of the secondary particle is not particularly limited, and normally in the range of from 3 µm to 50 µm. The lower limit may be no less than 4 µm, and the upper limit may be no more than 20 µm. The cathode 10 having excellent ion conductivity and electron conductivity may be obtained with the lithium-containing oxide active material 12 having such a range of particle diameter.

The content of the lithium-containing oxide active material 12 in the cathode 10 is not particularly limited. For example, setting the total amount of the above-mentioned conductive material 11a and the lithium-containing oxide active material 12, and the binder 13 which is described later as 100 mass %, the content of the lithium-containing oxide active material 12 may be no less than 80 mass %, may be no less than 85 mass %, and may be no less than 90 mass %. The upper limit is not particularly limited, and may be no more than 98 mass %, may be no more than 97 mass %, and may be no more than 95 mass %. With the content of the lithium-containing oxide active material 12 in these ranges, it is possible to obtain the cathode 10 having excellent ion conductivity and electron conductivity.

The cathode 10 may include a cathode active material other than the lithium-containing oxide active material 12 in a part. For example, the cathode 10 may include a cathode active material having an upper potential to the redox potential of metal lithium of less than 4.5 V (vs. Li/Li$^+$). However, in view of easily increasing the operating voltage of the lithium ion battery, no less than 80 mass % of the cathode active material included in the cathode 10 may be the lithium-containing oxide active material 12.

1.1.4. Binder 13

The cathode 10 optionally includes the binder 13. For the binder 13, any binder used for lithium ion batteries may be applied. Examples thereof include styrene butadiene rubber (SBR), carboxymethylcellulose (CMC), acrylonitrilebutadiene rubber (ABR), butadiene rubber (BR), polyvinylidene fluoride (PVDF), and polytetrafluoroethylene (PTFE). For the binder 13, one kind may be used alone, or a mixture of two or more kinds may also be used. The content of the binder 13 in the cathode 10 is not particularly limited, and for example the same amount as the binder included in the cathode of a conventional lithium ion battery may be contained.

The cathode 10 includes a cathode mixture layer 14 that includes the above-described conductive material 11a, layered niobium-containing oxide 11b and lithium-containing oxide active material 12. The thickness of the cathode mixture layer 14 is not particularly limited, and for example may be in the range of from 0.1 µm to 1 mm, and may be in the range of from 1 µm to 100 µm.

1.1.5. Cathode Current Collector 15

The above-described cathode mixture layer 14 is connected to a cathode current collector 15, which makes it possible to take out the electrical energy from the cathode current collector 15, via terminals and the like (not shown). The cathode current collector 15 is formed, for example, from a metal material including one or two or more elements selected from the group consisting of Cu, Ni, Al, V, Au, Pt, Mg, Fe, Ti, Co, Cr, Zn, Ge and In. The shape of the cathode current collector 15 is not particularly limited, and may be in the form of a foil, mesh, or other various shapes.

1.2. Non-Aqueous Electrolyte Solution 20

The lithium ion battery 100 includes the non-aqueous electrolyte solution 20. Normally, in a non-aqueous electrolyte solution lithium ion battery, a non-aqueous electrolyte solution exists inside the cathode, inside the anode, and between the cathode and the anode, which secures the lithium ion conductivity between the cathode and the anode.

The non-aqueous electrolyte solution 20 normally includes a lithium salt. Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. For the lithium salt, one kind may be used alone, or a mixture of two or more kinds may also be used.

The non-aqueous electrolyte solution 20 normally includes a non-aqueous solvent that dissolves the above-described lithium salts. Examples of the non-aqueous solvent include: cyclic esters (cyclic carbonates) such as ethylene carbonate (EC), propylene carbonate (PC) and butylene carbonate (BC); γ-butyrolactone; sulfolane; N-methyl pyrrolidone (NMP); chain esters (chain carbonates) such as 1,3-dimethyl-2-imidazolidinone (DMI); dimethyl carbonate (DMC), diethyl carbonate (DEC) and ethylmethyl carbonate (EMC); acetates such as methyl acetate and ethyl acetate; and ethers such as 2-methyltetrahydrofuran. For the non-aqueous solvent, one kind may be used alone, or a mixture of two or more kinds may also be used.

The concentration of the lithium salt in the non-aqueous electrolyte solution 20 may be, for example, in the range of from 0.3 mol/L to 5.0 mol/L, and may be in the range of from 0.8 mol/L to 1.5 mol/L. If the concentration of the lithium salt is too low, the capacity in a high rate might lower. If the concentration of the lithium salt is too high, the viscosity becomes high and the capacity at a low temperature might lower. As the non-aqueous electrolyte solution 20, for example a low volatile liquid such as ionic liquid may also be used.

1.3. Anode 30

The anode 30 may have the same structure as that of the anode of a conventional lithium ion battery. For example, the anode 30 includes a conductive material 31, an anode active material 32 and a binder 33. In the anode 30, the anode active material 32 is necessary, but the conductive material 31 and the binder 33 are optional. In the anode 30, an anode mixture layer 34 is formed from the anode active materials 32 etc. The anode mixture layer 34 is connected to an anode current collector 35, which makes it possible to take out the electrical energy from the current collector, via terminals and the like (not shown). The anode active material 32 is not particularly limited as long as it can occlude/release lithium ions. Examples thereof include active materials formed from carbon materials, active materials formed from oxides and active materials formed from metal. Examples of the carbon materials include graphite, mesocarbon microbeads (MCMB), highly oriented pyrolytic graphite (HOPG), hard carbon and soft carbon. Examples of the oxides include $Nb_2O_5$, $Li_4Ti_5O_{12}$ and silica. Examples of the metal include Li, In, Al, Si, Sn and alloys thereof. The shape of the anode active material 32 may be in a particle form or thin film form for example. If the anode active material 32 is formed in particles, the primary particle diameter may be in the range of from 1 nm to 100 μm. The lower limit may be no less than 10 nm, may be no less than 100 nm, and may be no less than 500 nm. The upper limit may be no more than 30 μm, and may be no more than 10 μm. The anode active material 32 may form a secondary particle in which the primary particles are gathered or agglomerated. In this case, the particle diameter of the secondary particle is not particularly limited, and normally in the range of from 3 μm to 50 μm. The lower limit may be no less than 4 μm, and the upper limit may be no more than 20 μm. The content of the anode active material 32 in the anode mixture layer 34 may be, for example, in the range of from 40 mass % to 99 mass %. The conductive material 31 and the binder 33 may be adequately selected from the examples of the conductive material 11a and the binder 13 of the cathode 10. The conductive material 31 and the conductive material 11a may be formed from different materials. The materials of the binder 33 and the binder 13 may also be different. The contents of the conductive material 31 and the binder 33 in the anode mixture layer 34 are not particularly limited. The anode current collector 35 is, for example, formed from a metal material including one or two or more elements selected from the group consisting of Cu, Ni, Al, V, Au, Pt, Mg, Fe, Ti, Co, Cr, Zn, Ge and In.

1.4. Separator 40

The lithium ion battery 100 may include a separator 40 between the cathode 10 and the anode 30. In the lithium ion battery 100, the separator 40, the cathode 10 and the anode 30 are immersed in the non-aqueous electrolyte solution 20. For the separator 40, any separator used in a conventional non-aqueous electrolyte solution lithium ion battery may be used. The separator 40 may be a porous film for example. The separator 40 may be formed from an organic material, or may be formed from an inorganic material. Specific examples of the separator 40 include a single-layered organic porous film of polypropylene (PP) or polyethylene (PE), and a PP/PE/PP layered type organic porous film. The thickness of the separator 40 is not particularly limited, and it may be in the range of from 0.1 μm to 1000 μm, and may be in the range of from 0.1 μm to 300 μm.

A power generation element is formed from the above-described cathode 10, non-aqueous electrolyte solution 20 and anode 30, to be the lithium ion battery 100. In the lithium ion battery 100, the cathode 10 includes the layered niobium-containing oxide 11b that coats the surface of the conductive material 11a. Thus, generation of gas due to decomposition of the non-aqueous electrolyte solution on the surface of the conductive material 11a can be inhibited.

2. Method for Manufacturing Lithium Ion Battery 100

Figure 2:
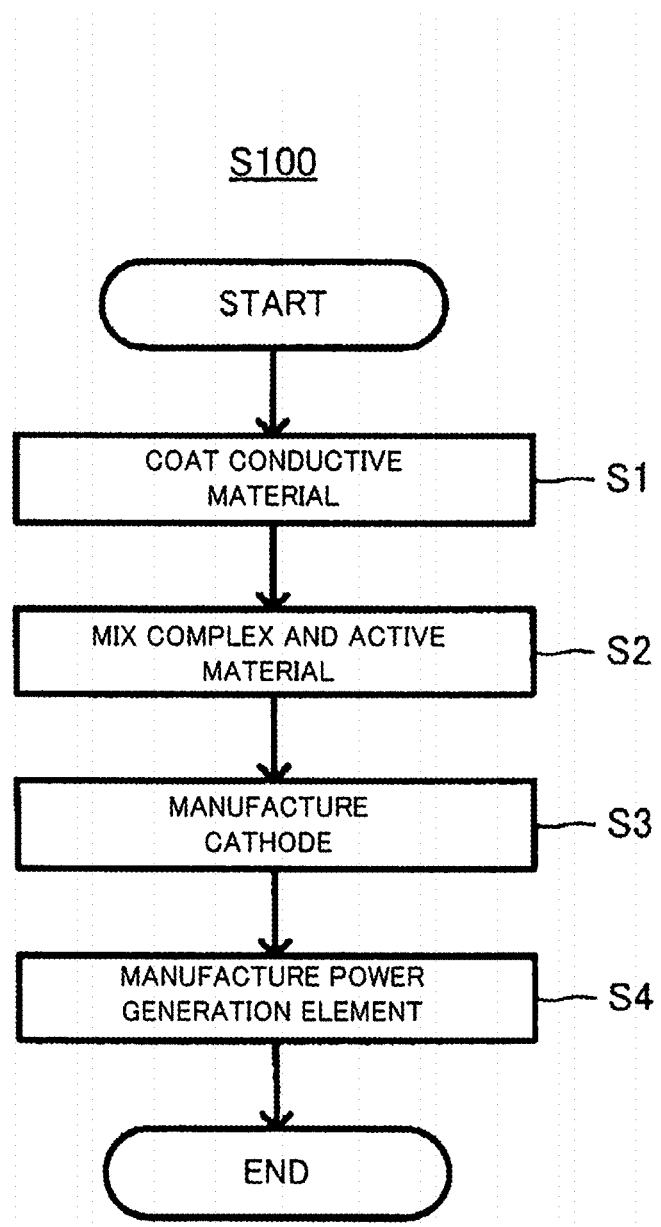
FIG. 2 is a flow chart to explain a method for manufacturing a lithium ion battery (S100)

The lithium ion battery 100 may be manufactured by the method disclosed in FIG. 2, for example. The manufacturing method (S100) disclosed in FIG. 2 includes a first step (S1) of coating the surface of the conductive material 11a with the layered niobium-containing oxide 11b to form the complex 11, a second step (S2) of mixing the complex 11 and the lithium-containing oxide active material 12 having an upper potential to the redox potential of metal lithium of no less than 4.5 V (vs. $Li/Li^+$) to obtain a cathode mixture, a third step (S3) of manufacturing the cathode 10 from the cathode mixture, and a fourth step (S4) of manufacturing a power generation element from the cathode 10, the non-aqueous electrolyte solution 20 and the anode 30.

2.1. First Step (S1)

In S1, the surface of the conductive material 11a is coated with the layered niobium-containing oxide 11b to form the complex 11. S11 may be carried out by various methods. For example, a method of forming a film of the niobium-containing oxide 11 on the surface of the conductive material 11a by atomic layer deposition (ALD), chemical vapor deposition (CVD), sputtering, and a method of spraying a precursor of the niobium-containing oxide over the surface of the conductive material 11a and thereafter drying the film, and the like. Among them, ALD may be used because the thickness of the layered niobium-containing oxide 11b can be easily controlled by increasing/decreasing the cycle number of the supply and purge of the precursor. With ALD, it is possible to uniformly provide an extremely thin layer of the niobium-containing oxide 11b of no more than 5 nm in thickness on the surface of the conductive material 11a.

It is considered that a core is preferentially formed at the part of functional group on the surface of the conductive material 11a by ALD. For example, when the conductive material 11a is formed from a carbon material (e.g. acetylene black), it is considered that the formation and growth of the core is preferentially formed at the edge portion (end portion of graphene structure) dotted on the surface of the conductive material 11a. Thus, it may be considered to be difficult to form a uniform layer over the whole surface of the conductive material 11a. Actually, when aluminum oxide is accumulated on the surface of acetylene black, the aluminum oxide is dotted on the surface of the acetylene black to form a layer having many gaps. However, as a result of intensive research by the inventors of the present disclosure, when only a niobium-containing oxide was used, it was surprisingly possible to form a uniform layer of less than 5 nm in thickness over the whole surface of the niobium-containing oxide by ALD, even though the surface had the dotted edge portion like the carbon material (see FIG. 3).

2.2. Second Step (S2)

In S2, the complex 11 and the lithium-containing oxide active material 12 having an upper potential to the redox potential of metal lithium of no less than 4.5 V (vs. Li/Li$^+$) are mixed to obtain a cathode mixture. The binder 13 may be mixed in addition to the complex 11 and the active material 12. A solvent may also be added to make the cathode mixture have a slurry form. The mixing ratio of the complex 11, the active material 12 and the binder 13 is as mentioned above. S2 may be carried out by various mixing methods. For example, as a mixing method, mixing manually by means of a mortar, and mixing mechanically by a shaker, ultrasonic wave disperser, stirring machine, and the like may be used. If the mixing energy in S2 is too large, the complex 11 is crushed, and the niobium-containing oxide 11b peels off from the complex 11. The mixing method may be selected with consideration of energy to be added to the complex 11.

2.3. Third Step (S3)

In S3, the cathode 10 is manufactured from a cathode mixture. When the cathode mixture is in a slurry form including a solvent, the cathode 10 including a cathode mixture layer 14 on the surface of the cathode current collector 15 may be easily manufactured by applying the slurry onto the surface of the cathode current collector 15, by a doctor blade and the like, and drying the slurry. When the cathode mixture does not include a solvent, for example, when the cathode mixture is in a powder form, the cathode 10 including the cathode mixture layer 14 on the surface of the cathode current collector 15 may be easily manufactured by carrying out a press forming step on the powder and the cathode current collector 15, while optionally heating them.

2.4. Fourth Step (S4)

In S4, a power generation element is manufactured from the cathode 10, the non-aqueous electrolyte solution 20 and the anode 30. For example, the cathode 10 and the anode 30 are accommodated in predetermined positions in a battery case. Here, a stack in which the separator 40 is sandwiched by the cathode 10 and the anode 30 may be made, and the stack may be accommodated in a predetermined position in the battery case. Then, the inside of the case is filled with the non-aqueous electrolyte solution 20 to immerse the cathode 10 and the anode 30 in the non-aqueous electrolyte solution 20, whereby the power generation element may be manufactured. After that, the battery case is sealed and so on, whereby the lithium ion battery 100 is obtained.

The manufacturing methods of the non-aqueous electrolyte solution 20 and the anode 30 are the same as before. For example, the methods disclosed in Patent Literatures 1 to 5 may be referenced. Detailed explanation is omitted here.

EXAMPLES

1. Manufacture of Lithium Ion Battery

Lithium ion batteries according to Examples 1 to 7, Reference Example 1 and Comparative Examples 1 to 3 were manufactured as follows.

Example 1

(Coating of Conductive Material)

A film of niobium oxide was formed on the surface of a conductive material (acetylene black, manufactured by Denka Company Limited, particle form, particle diameter: approximately 50 nm) by an ALD apparatus (manufactured by PICOSUN Oy), whereby a complex was obtained. Niobium ethoxide was used as a niobium source, and water was used as an oxygen source. When the film was formed, the temperature of niobium ethoxide was 200° C., the temperature of water was 20° C., and the temperature of the reaction vessel was 200° C. An input of niobium ethoxide, a purge, an input of water, and purge were determined as 1 cycle (film formation rate: 0.4 Å/cyc), and 10 cycles were carried out. The thickness of the layered niobium oxide of the complex was approximately 0.4 nm.

(Manufacture of Cathode Mixture)

With a mortar, the complex and a lithium-containing oxide active material (LiNi$_{0.5}$Mn$_{1.5}$O$_4$) were mixed. To the obtained mixture, polyvinylidene fluoride (PVdF) dissolved in n-methylpyrrolidone (NMP) and a binder (manufactured by KUREHA CORPORATION) were added. The obtained material was mixed and dispersed by a mixer, whereby a cathode mixture slurry was manufactured. In the cathode mixture slurry, the mass ratio of the lithium-containing oxide active material, the complex, and the binder was 85:10:5.

(Manufacture of Cathode)

The cathode mixture slurry was applied on the surface of a cathode current collector (aluminum foil, thickness 15 μm) by a doctor blade, and dried at 80° C. in air to remove NMP. Thereafter, the obtained material was dried in a vacuum at 120° C. for 10 hours. After that, the cathode mixture layer and the cathode current collector were pressed to bond to each other by pressure, whereby a cathode was obtained. The thickness of the cathode mixture layer was approximately 30 μm.

(Manufacture of Lithium Ion Battery)

The cathode, an anode (graphite), and a non-aqueous electrolyte solution (in which lithium hexafluorophosphate (LiPF$_6$) as lithium salt was dissolved to be 1 mol/L in concentration in a mixture solvent of EC and EMS of 3:7 in volume ratio) were sealed in a laminate pack, whereby a lithium ion battery was manufactured.

Examples 2 to 6

Complexes were manufactured in the same manner as in Example 1, except that the number of the cycles in ALD was changed to 25 cyc., 50 cyc., 75 cyc., 125 cyc. and 175 cyc. Cathode mixtures, cathodes and lithium batteries were manufactured in the same manner as in Example 1. In Examples 2 to 5, the thicknesses of the layered niobium oxides in the complexes were approximately: 1 nm; 2 nm; 3 nm; 5 nm; and 7 nm, respectively.

Example 7

(Coating of Conductive Material)
A film of lithium niobate was formed on the surface of a conductive material (acetylene black, manufactured by Denka Company Limited, particle form, particle diameter: approximately 50 nm) by an ALD apparatus (manufactured by PICOSUN Oy), whereby a complex was obtained. Niobium ethoxide was used as a niobium source, lithium tert-butoxide was used as the lithium source, and water was used as an oxygen source. When the film was formed, the temperature of niobium ethoxide was 200° C., the temperature of lithium tert-butoxide was 140° C., the temperature of water was 20° C., and the temperature of the reaction vessel was 235° C. An input of niobium ethoxide, a purge, an input of lithium tert-butoxide, a purge, an input of water, and a purge, were determined as 1 cycle (film formation rate: 2 Å/cyc.), and 10 cycles were carried out. The thickness of the layered lithium niobate of the complex was approximately 2 nm.
(Manufacture of Cathode Mixture, Cathode and Lithium Ion Battery)
A cathode mixture, a cathode and a lithium ion battery were manufactured in the same manner as in Example 1, except that the complex was changed.

Reference Example 1

A cathode mixture, a cathode and a lithium ion battery were manufactured in the same manner as in Example 2, except that the following composite active material was used as the lithium-containing oxide active material.
(Manufacture of Composite Active Material)
A film of niobium oxide was formed on the surface of a lithium-containing oxide active material in the same conditions as in Example 2 (25 cyc.), whereby a composite active material was obtained. In the composite active material, the thickness of the layered niobium oxide was approximately 1 nm.

Comparative Example 1

A cathode mixture, a cathode and a lithium ion battery were manufactured in the same manner as in Example 1, except that the coating of conductive material was not carried out.

Comparative Example 2

(Coating of Conductive Material)
A surface of a conductive material (acetylene black, manufactured by Denka Company Limited, particle form, particle diameter: approximately 50 μm) was coated with aluminum oxide by an ALD apparatus (manufactured by PICOSUN Oy), whereby a complex was obtained. Trimethylaluminum was used as an aluminum source, and water was used as an oxygen source. When the coating was carried out, the temperature of trimethylaluminum was 20° C., the temperature of water was 20° C., and the temperature of the reaction vessel was 200° C. An input of trimethylaluminum, a purge, an input of water, and a purge were determined as 1 cycle (film formation rate: 1 Å/cyc.), and 10 cycles were carried out.
(Manufacture of Cathode Mixture, Cathode and Lithium Ion Battery)
A cathode mixture, a cathode and a lithium ion battery were manufactured in the same manner as in Example 1, except that the complex was changed.

Comparative Example 3

Figure 3B:
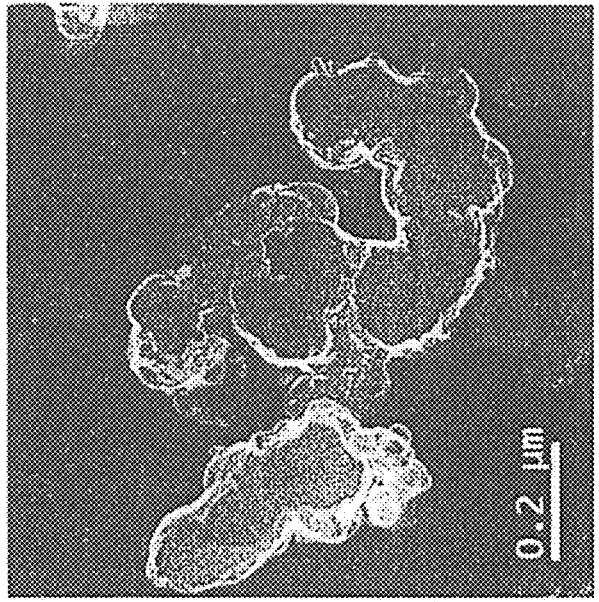
FIGS. 3A and 3B include a HAADF-STEM image of the surface of a complex (conductive material and layered niobium-containing oxide) used in Example 3.
Figure 3A:
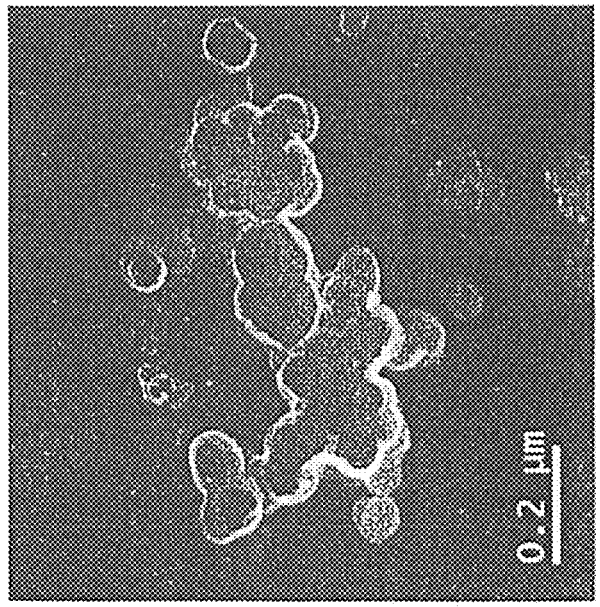
Figure 4B:
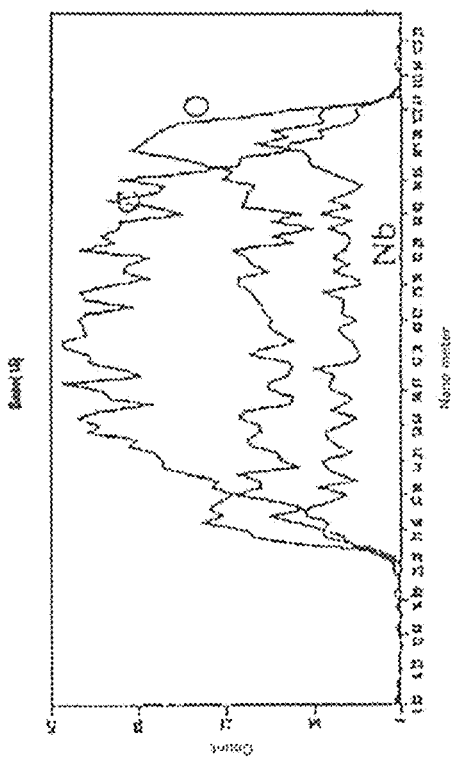
FIGS. 4A and 4B include a HAADF-STEM image and a view to show the results of elemental analysis of the surface of the complex (conductive material and layered niobium-containing oxide) used in Example 3.
Figure 4A:
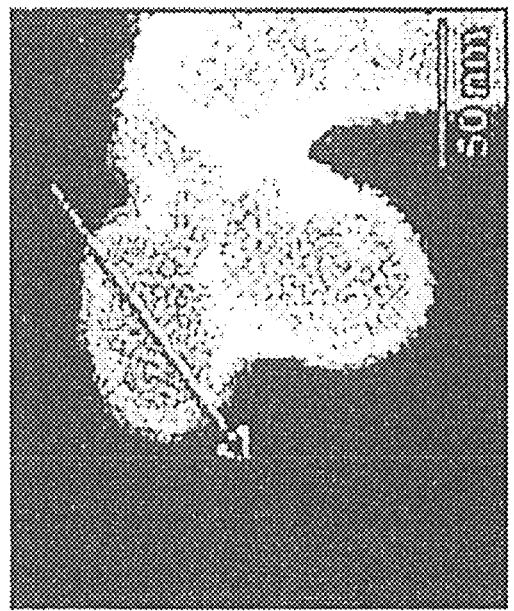

A complex was manufactured in the same manner as in Comparative Example 2, except that the number of cycles in ALD was changed to 30 cyc. A cathode mixture, a cathode and a lithium ion battery were manufactured in the same manner as in Comparative Example 2.
2. Evaluation of Lithium Ion Battery
Evaluations of the manufactured lithium ion batteries were made by the following method.
<Observation of Surface Condition of Complex>
HAADF-STEM images of the complex used in Example 3 were obtained by a high-angle annular dark-field method by means of a scanning transmission electron microscope (HAADF-STEM method). The results are shown in FIGS. 3A, 3B, 4A and 4B. FIGS. 3A and 3B include an image to observe a cross section of the complex after being filled with resin. FIG. 3A and FIG. 3B are both HAAD-FSTEM images of the cross section of the complex used in Example 3, whose observation areas are different. FIG. 4A is an image to show the surface of the complex before being filled with resin. FIG. 4B is for analysis of the number of elements existing in the range shown by the arrow in FIG. 4A. The left end of the horizontal axis of FIG. 4B corresponds to the base end of the arrow, and the right end of the horizontal axis corresponds to the tip of the arrow. From FIG. 4B, the element ratio existing on the "surface" of the complex can be determined.

In FIGS. 3A, 3B, 4A and 4B, heavy metal (Nb) was included at the portions shown in white. As is apparent from FIGS. 3A, 3B, 4A and 4B, it was possible to uniformly form a film of layered niobium oxide onto the surface of the conductive material by ALD, without aggregating the niobium oxide. As to the complexes of Examples 1, 2 and 4 to 7, and Reference Example 1 as well, it was possible to form a film of layered niobium oxide or layered lithium niobate onto the surface of the conductive material, without aggregating them.
<Charge-Discharge Test>
A process of separating (releasing) lithium ions from the cathode was determined as "charge", and a process of inserting (occluding) lithium ions to the cathode was determined as "discharge". A charge-discharge test was carried out with a charge-discharge testing machine (HJ-1001 SM8A, manufactured by HOKUTO DENKO CORPORATION). Charge and discharge were repeated in the range of from 3.5 V to 4.9 V, with the current value set as 1/3C and at the temperature of 25° C. The discharge capacity at the third cycle was determined as the initial capacity. After that, the SOC was adjusted to 60%, and discharge was carried out at 5C rate for 10 seconds. From the drop voltage difference at the discharge, the battery resistance was calculated. The results are shown in Table 1 below.

In addition, charge and discharge were carried out for 100 cycles in the range of from 3.5 V to 4.9 V at the current value of 2C and at the temperature of 60° C. From the amount of swell of the laminate pack, the amount of gas generated in the battery was estimated. The results are shown in Table 1 below.

TABLE 1

|  | ALD cycle number | thickness of coating layer (nm) | kind of coating layer | cell resistance (Ω) | gas generation amount (cm³) |
|---|---|---|---|---|---|
| Comp. Ex. 1 | 0 | 0 | — | 3.1 | 1.13 |
| Comp. Ex. 2 | 10 | — | aluminum oxide | 3.0 | 0.90 |
| Comp. Ex. 3 | 30 | — | aluminum oxide | 3.2 | 0.87 |
| Ex. 1 | 10 | 0.4 | niobium oxide | 3.1 | 0.66 |
| Ex. 2 | 25 | 1 | niobium oxide | 3.2 | 0.65 |
| Ex. 3 | 50 | 2 | niobium oxide | 3.1 | 0.62 |
| Ex. 4 | 75 | 3 | niobium oxide | 3.2 | 0.60 |
| Ex. 5 | 125 | 5 | niobium oxide | 3.5 | 0.59 |
| Ex. 6 | 175 | 7 | niobium oxide | 4.5 | 0.59 |
| Ex. 7 | 10 | 2 | lithium niobate | 3.2 | 0.57 |
| Ref. Ex. 1 | 25 | 1 | niobium oxide | 6.1 | 0.51 |

As is apparent from the results shown in Table 1, as to the lithium ion batteries of Examples 1 to 7 and Reference Example 1, it was possible to remarkably inhibit the generation of gas due to decomposition of the non-aqueous electrolyte solution on the surface of the conductive material when the batteries were charged and discharged, compared to the lithium ion battery of Comparative Example 1. In addition, from Examples 1 to 7, it was determined that the gas generation amount became small but the cell resistance became large, as the thickness of the niobium-containing layered oxide increased. Considering as a reason of the increase in the cell resistance was that the resistance of electron at the interface of the conductive material increased, whereby the supply of electrons delayed, as a result, the supply of electrons from the conductive material became a bottleneck. That is, from the results of Examples 1 to 7, it was determined that it was possible to keep the cell resistance low and at the same time to inhibit the generation of gas, by making the thickness of the layered niobium-containing oxide in the range of from 0.4 nm to 5.0 nm. Meanwhile, from the result of Reference Example 1, it was determined that it was possible to further hold down the generation amount of gas by coating not only the conductive material but also the surface of the cathode active material with the layered niobium-containing oxide. However, it was also determined that the cell resistance excessively increased when the surface of the cathode active material was coated with the layered niobium-containing oxide.

In addition, from Comparative Examples 1 to 3, it was determined that it was possible to hold down the generation amount of gas even when the surface of the conductive material was coated with aluminum oxide. However, when the surface was coated with aluminum oxide, the remarkable effect was not obtained as in a case in which the surface was coated with the niobium-containing oxide.

As described above, it was found that it was possible to remarkably inhibit the generation of gas due to decomposition of a non-aqueous electrolyte solution generated when a high-potential active material was used, by forming a lithium ion battery with a cathode including a conductive material, a layered niobium-containing oxide that coats a surface of the conductive material, and a lithium-containing oxide active material having an upper electrical potential to the redox potential of metal lithium of no less than 4.5 V (vs. Li/Li$^+$).

INDUSTRIAL APPLICABILITY

The lithium ion battery according to the present disclosure may be used for various power sources as a primary battery or a secondary battery. For example, it can be applied as a power source for vehicle mounting.

The examples disclose various embodiments that are not intended to limit the scope of the disclosure. It will be understood that various changes and modification can be made without departing from the scope of this disclosure.

DESCRIPTION OF REFERENCE NUMERALS

100 lithium ion battery
10 cathode
14 cathode mixture layer
11 complex
11a conductive material
11b layered niobium-containing oxide
12 lithium-containing oxide active material
13 binder
15 cathode current collector
20 non-aqueous electrolyte solution
30 anode
34 anode mixture layer
31 conductive material
32 anode active material
33 binder
35 cathode current collector
40 separator

What is claimed is:

1. A method for manufacturing a lithium ion battery comprising:
    coating only a surface of a conductive material with a layered niobium-containing oxide to form a complex;
    mixing the complex and a lithium-containing oxide active material having an upper-limit potential to a redox potential of metal lithium of no less than 4.5 V (vs. Li/Li$^+$) to obtain a cathode mixture;
    manufacturing a cathode from the cathode mixture; and
    manufacturing a power generation element from the cathode, a non-aqueous electrolyte solution and an anode.

2. The method according to claim 1, wherein the coating of the layered niobium-containing oxide is by an atomic layer deposition (ALD).

3. The method according to claim 1, wherein said layered niobium-containing oxide has a thickness of in the range of no less than 0.4 nm.

4. The method according to claim 1, wherein said layered niobium-containing oxide has a thickness in the range of 0.4 nm to 5 nm.

5. The method according to claim 1, wherein the conductive material consists of a carbon material.

6. The method according to claim 1, wherein said niobium-containing oxide includes niobium oxide and lithium niobate.

7. The method accordingly to claim 1, wherein said lithium-containing oxide includes a lithium nickel manganese composite oxide.

8. The method according to claim 1, wherein said conductive material is in a particulate form having a particle diameter of 5 nm to 100 nm and an aspect ratio of less than 2.

9. The method according to claim 1, wherein said conductive material is in a fibrous form having a fiber diameter of 10 nm to 1 μm and has an aspect ratio of no less than 20.

10. The method according to claim 1, wherein in the coating, the surface of the conductive material is continuously coated with the layered niobium-containing oxide along the surface shape of the conductive material to form the complex.

\* \* \* \* \*